United States Patent
Maki et al.

(10) Patent No.: US 8,619,014 B2
(45) Date of Patent: Dec. 31, 2013

(54) LIQUID CRYSTAL DISPLAY DEVICE

(75) Inventors: Masahiro Maki, Mobara (JP); Hideo Sato, Hitachi (JP); Hiroyuki Abe, Chiba (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 612 days.

(21) Appl. No.: 12/835,815

(22) Filed: Jul. 14, 2010

(65) Prior Publication Data

US 2011/0019118 A1    Jan. 27, 2011

(30) Foreign Application Priority Data

Jul. 23, 2009   (JP) ................... 2009-172261

(51) Int. Cl.
G09G 3/36    (2006.01)
(52) U.S. Cl.
USPC ................... 345/98; 348/89; 348/92
(58) Field of Classification Search
USPC ............... 345/98, 89, 92
See application file for complete search history.

(56) References Cited

U.S. PATENT DOCUMENTS

2003/0174118 A1* 9/2003 Sato et al. ............. 345/100
2007/0273633 A1* 11/2007 Hashimoto et al. ..... 345/98
2011/0182399 A1* 7/2011 Tobita ................... 377/70

FOREIGN PATENT DOCUMENTS

JP    2008-309902    12/2008

* cited by examiner

Primary Examiner — William Boddie
Assistant Examiner — Leonid Shapiro
(74) Attorney, Agent, or Firm — Antonelli, Terry, Stout & Kraus, LLP.

(57) ABSTRACT

A liquid crystal display device which can reduce a circuit scale of a drive circuit is provided. A TFT substrate of the liquid crystal display device includes a pixel circuit in each pixel, and the pixel circuit includes a thin film transistor, a pixel electrode which is connected to a source side of the thin film transistor, and a common electrode which is one planar transparent electrode extending in a display region in a planar shape. A vertical drive circuit includes a transistor which is driven by a control signal voltage including a clock signal from a drive IC, and constitutes a damper for a high voltage. The drive IC outputs an equalizing switch signal voltage to equalizing switches which connect the common electrode and data signal lines.

3 Claims, 7 Drawing Sheets

LIQUID CRYSTAL DISPLAY DEVICE

CROSS-REFERENCE TO RELATED APPLICATION

The present application claims priority from Japanese application JP 2009-172261 filed on Jul. 23, 2009, the content of which is hereby incorporated by reference into this application.

BACKGROUND OF THE INVENTION

1. Field of the Invention

The present invention relates to a liquid crystal display device, and more particular to a liquid crystal display device having a liquid crystal display panel which incorporates a drive circuit therein.

2. Background Art

As one of display devices used for information terminal devices such as computers or television receiver sets, a liquid crystal display device has been popularly used. The liquid crystal display device is a device which controls an image to be displayed by changing the degree of transmissivity of light by controlling the alignment of liquid crystal composition sealed between a thin film transistor substrate (hereinafter referred to as "TFT (Thin Film Transistor) substrate") and a color filter substrate.

To change the alignment of the liquid crystal composition, it is necessary to change an electric field between the substrates by controlling voltages applied to electrodes provided to the substrates. When the polarity of the applied voltage is deviated, the lifetime of a liquid crystal panel becomes short and hence, a display image is controlled by so-called inversion driving which drives the liquid crystal display device while inverting the polarities of the applied voltage. In the inversion driving, the positive polarity and the negative polarity are repeatedly alternately applied to pixel electrode which holds a grayscale voltage and a common electrode which forms an electric field in combination with the pixel electrode. That is, the positive polarity and the negative polarity are alternately applied to each common electrode line. JP 2008-309902 discloses the inversion driving.

SUMMARY OF THE INVENTION

On the other hand, with respect to a drive circuit for applying a voltage to the common electrode lines, there has been a demand for the reduction of a circuit scale to cope with so-called narrowing of a picture frame which increases a display area relative to an area of a liquid crystal panel of the liquid crystal display device or the like.

The present invention has been made under such circumstances, and it is an object of the present invention to provide a liquid crystal display device which can reduce a circuit scale of a drive circuit.

The liquid crystal display device according to the present invention is a liquid crystal display device which performs a display by controlling the alignment of the liquid crystal composition. The liquid crystal display device includes a plurality of pixel electrodes to which a voltage based on a grayscale voltage is applied; one common electrode which is arranged on the same substrate as the plurality of pixel electrodes and forms an electric field for aligning the liquid crystal composition in combination with the plurality of pixel electrodes; pixel transistors which are connected to the plurality of pixel electrodes respectively and constitute switches for applying a grayscale voltage to the pixel electrodes; data signal lines which are connected to the pixel transistors and to which the grayscale voltage is applied; equalizing transistors which constitute switches for making the common electrode and the data signal lines conductive with each other; and a shift register which sequentially applies a signal to gate lines of the pixel transistors wherein the equalizing transistor is operated so as to make the common electrode and the data signal line conductive with each other at a cycle that the polarity of the common electrode is reversed, and the shift register includes a transistor which constitutes a damper for attenuating a potential difference.

Further, in the liquid crystal display device of the present invention, a clock signal may be inputted to the shift register, and the transistor which constitutes the damper may be arranged between a node to which a voltage which is twice as large as a voltage of a clock signal is applied and a node to which the clock signal is inputted.

Still further, in the liquid crystal display device of the present invention, the plurality of transistors each of which constitutes the damper may be continuously arranged.

The liquid crystal display device according to the present invention includes: a liquid crystal display panel; and a drive circuit which drives the liquid crystal display panel, wherein the liquid crystal display panel comprises: a plurality of pixel electrodes; a common electrode; pixel transistors which are connected to the plurality of pixel electrode respectively and constitute switches for applying a grayscale voltage to the pixel electrodes; data signal lines which are connected to the pixel transistors and to which the grayscale voltage is applied; equalizing transistors which constitute switches for making the common electrode and the data signal lines conductive with each other; and a shift register which supplies a scanning signal to gate lines of the pixel transistors, wherein the equalizing transistor is operated so as to make the common electrode and the data signal line conductive with each other, and a clock signal is inputted to the shift register, and the clock signal is outputted from the shift register as the scanning signal, and the shift register includes a transistor which attenuates a potential difference.

DETAIL DESCRIPTION OF THE EMBODIMENTS

Hereinafter, an embodiment of the present invention is explained in conjunction with drawings. Here, in all drawings, identical or similar parts are given same symbols and their repeated explanation is omitted.

Figure 1:
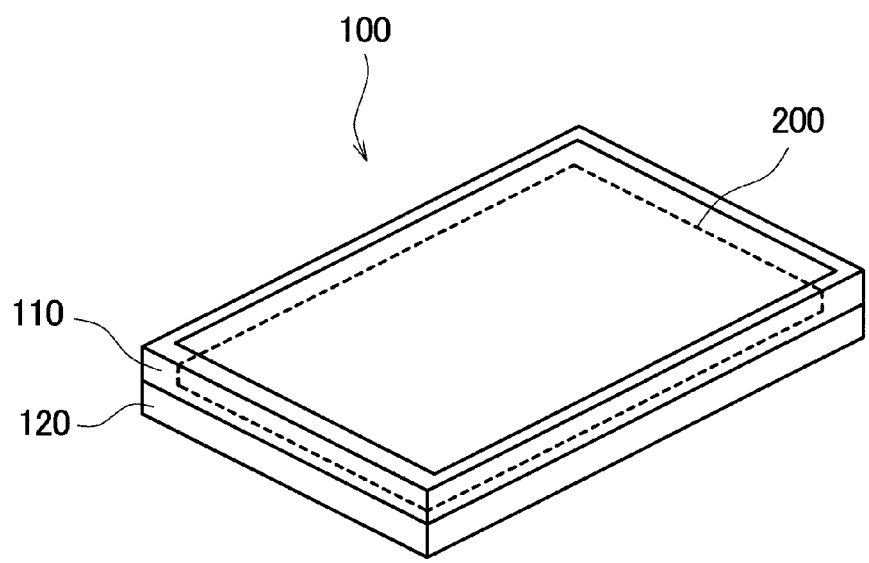
FIG. 1 is a view schematically showing a liquid crystal display device according to one embodiment of the present invention.

FIG. 1 schematically shows a liquid crystal display device 100 according to one embodiment of the present invention. As shown in FIG. 1, the liquid crystal display device 100 is constituted of a liquid crystal display panel 200 which is fixed in a sandwiched state between an upper frame 110 and a lower frame 120, a backlight device and the like not shown in the drawing.

Figure 2:
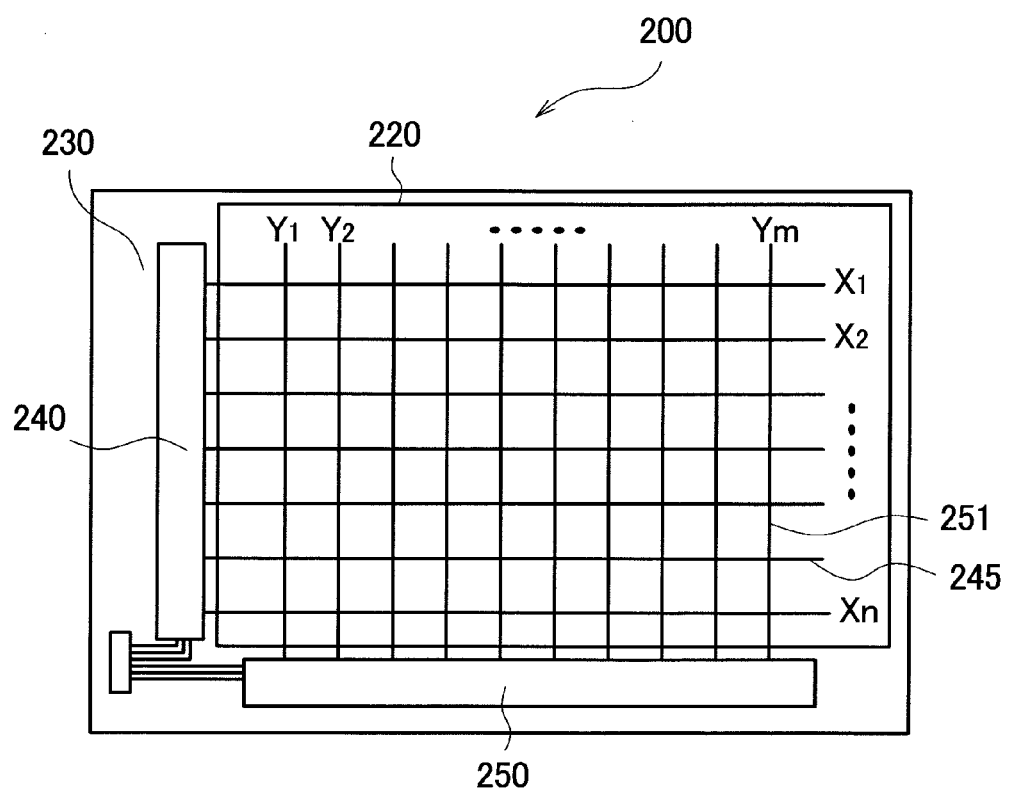
FIG. 2 is a view showing the constitution of a liquid crystal display panel in FIG. 1.

FIG. 2 shows the constitution of the liquid crystal display panel 200 in FIG. 1. The liquid crystal display panel 200 includes two substrates, that is, a TFT substrate 230 and a color filter substrate 220, and the liquid crystal composition is sealed between two substrates. The liquid crystal display panel 200 is a lateral-electric-field type, that is, a so-called IPS (In Plane Switching)-type liquid crystal panel in which pixel electrodes 305 and a common electrode 307 described later are mounted on the TFT substrate 230 in common. On the TFT substrate 230, scanning signal lines $X_1$ to $X_n$ which are controlled by a vertical drive circuit 240 and data signal lines $Y_1$ to $Y_m$ which are controlled by a drive IC (Integrated Circuit) 250 are arranged, and these signal lines form pixels of the liquid crystal display device 100. Here, although the Liquid crystal display panel 200, for pixels the number of which corresponds to the resolution of a display of the liquid crystal display panel 200, for preventing the drawing from becoming cumbersome, in FIG. 2, the pixels are shown in a simplified manner.

Figure 3:
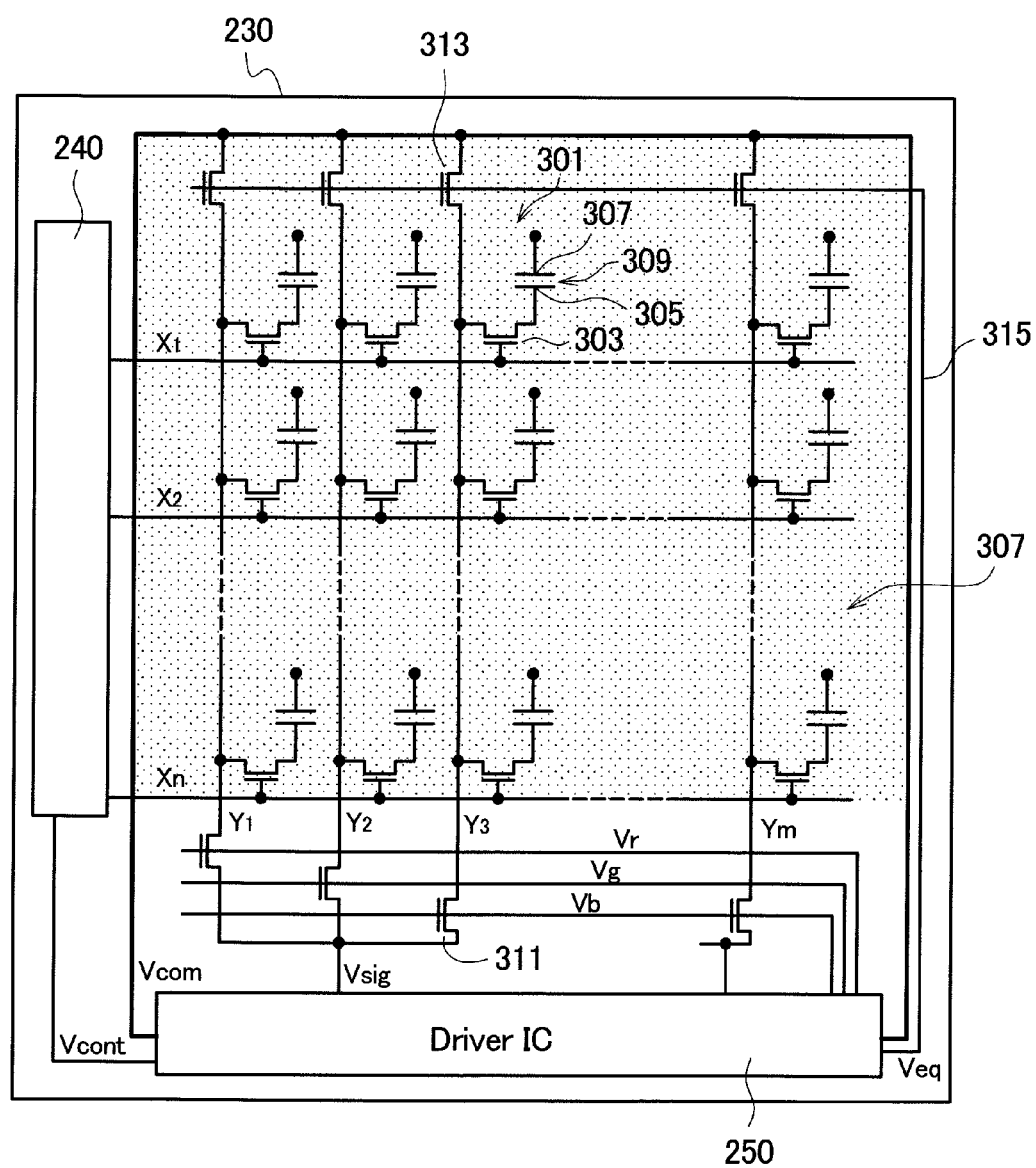
FIG. 3 is a view schematically showing a circuit of a TFT substrate shown in FIG. 2.

FIG. 3 is a view schematically showing a circuit of the TFT substrate 230. Each pixel includes a pixel circuit 301. The pixel circuit 301 is constituted of a thin film transistor 303 which has a gate thereof connected to the scanning signal line $X_1$ and a drain thereof connected to the data signal line $Y_1$, a pixel electrode 305 which is connected to a source side of the thin film transistor 303, and a plate-shaped common electrode 307 which extends in a display region in a planar shape. Although the common electrode 307 is formed of a plate-shaped transparent electrode which extends in a planar shape, in the inside of the pixel circuit 301 shown in the drawing, for explaining an operation of the circuit, the common electrode 307 is shown as one electrode of a capacitor 309.

To the respective data signal lines $Y_1$ to $Y_m$ which extend from the drive IC 250, RGB switches 311 for respective colors of red (R), green (G) and blue (B) are provided. A Gray-scale voltage which corresponds to the pixel of one color is applied to the respective data signal lines simultaneously. Further, the data signal lines $Y_1$ to $Y_m$ are provided with an equalizing switch 313 respectively so that the common electrode 307 and the data signal lines $Y_1$ to $Y_m$ are connected with each other.

The vertical drive circuit 240 is driven in response to a control signal voltage Vcont which includes clock signals GCK1, GCK2 outputted from the drive IC 250. The drive IC 250 outputs, besides the control signal voltage Vcont, a common electrode voltage Vcom which is applied to the common electrode 307, a data signal voltage Vsig, an R-switch signal voltage Vr, a G-switch signal voltage Vg and a B-switch signal voltage Vb which are gate signals to the respective RGB switches 311, and an equalizing switch signal voltage Veq which is applied to an equalizing switch signal line 315 which constitutes a gate signal line of the equalizing switch 313.

Figure 4:
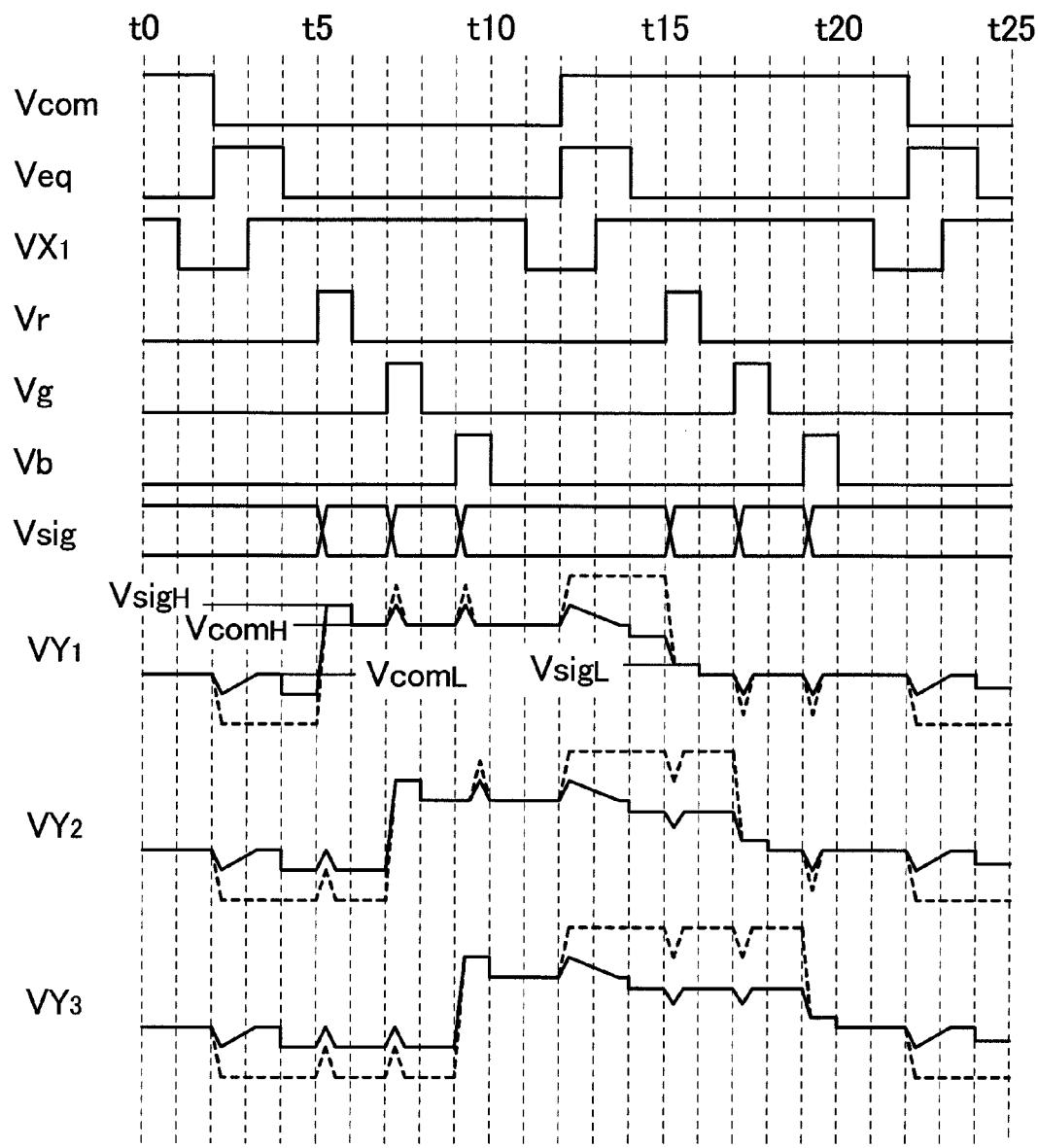
FIG. 4 is a timing chart showing a mode in which respective signals in FIG. 3 are changed.

FIG. 4 is a timing chart showing a mode in which respective signals in three pixels which are specified by the scanning signal line $X_1$ and the data signal lines $Y_1$ to $Y_3$ are changed. Here, symbol $VX_1$ indicates a voltage of the scanning signal line $X_1$, symbols $VY_1$ to $VY_3$ respectively indicate voltages of the data signal lines $Y_1$ to $Y_3$ of red (R), green (G) and blue (B). Here, assume that the TFT substrate 230 is operated by line inverse driving, and the timing chart shows an operation of the TFT substrate 230 at the time of performing the all-white display in normally black display. Further, a dotted line in the timing chart indicates operations of signals when equalizing switches 313 are not provided.

In the timing chart of FIG. 4, at a point of time t0, the switch signal voltages Vr, Vg and Vb of the respective RGB switches 311 assume a LOW level, and the equalizing switch signal voltage Veq also assumes a LOW level and hence, the data signal lines $Y_1$ to $Y_3$ are in a floating state. At a point of time t2, the common electrode voltage Vcom is changed over to a negative potential VcomL from a positive potential due to the inversion driving and, at the same time, the equalizing switch signal voltage Veq assumes a HIGH level so that the common electrode 307 and the data signal lines $Y_1$ to $Y_3$ are made conductive with each other whereby the voltages $VY_1$ to $VY_3$ of the data signal lines become the common electrode voltage Vcom.

Next, at a point of time t3, the voltage $VX_1$ of the scanning signal line $X_1$ assumes a HIGH level thus selecting a row of pixels to which the gray-scale voltage is applied, and at a point of time t4, the equalizing switch signal voltage Veq assumes a LOW level so that the equalizing switch 313 is turned off. Next, at a point of time t5, the data signal voltage Vsig assumes a red gray-scale voltage VsigH and, at the same time, the R-switch signal voltage Vr assumes a HIGH level so that the gray-scale voltage VsigH is applied to the data signal line $Y_1$. Here, the voltage $VX_1$ of the scanning signal line $X_1$ is at the HIGH level and hence, the thin film transistor 303 which is connected to the scanning signal line $X_1$ is brought into a conductive state so that the gray-scale voltage VsigH is written in the pixel electrode 305. At a point of time t6, the R-switch signal voltage Vr assumes a LOW level so that a potential difference (VsigH−VcomL) between the common electrode voltage Vcom and the data signal voltage Vsig is held in the capacitor 309, and the alignment of liquid crystal composition is adjusted by an electric field caused by the potential difference whereby the brightness of red light is controlled.

Further, although a voltage $VY_1$ is held also at the data signal line $Y_1$, the data signal line $Y_1$ overlaps with the common electrode to which the common electrode voltage Vcom is applied and hence, a potential difference (VsigH−VcomL) is held at the common electrode 307 in the same manner as the capacitor 309.

Here, when the equalizing switch 313 is not operated at a point of time t2, the common electrode voltage Vcom is changed over to the negative potential VcomL from the positive potential due to the inversion driving, since the data signal lines $Y_1$ to $Y_3$ are in a floating state, the potential difference substantially equal to the potential difference held at the capacitor 309 is maintained in the data signal lines $Y_1$ to $Y_3$ so that the voltage $VY_1$ is largely shifted downward as indicated by a dotted line in FIG. 4 whereby a load for elevating the voltage $VY_1$ to the gray-scale voltage VsigH of the data signal line $Y_1$ is increased. However, due to the operation of the equalizing switch 313 performed at a point of time t2, the common electrode 307 and the data signal line $Y_1$ assume the same potential and hence, the load for elevating the potential of the data signal line $Y_1$ to the gray-scale voltage VsigH is decreased.

Here, when the common electrode voltage Vcom is changed over to the negative potential VcomL from the positive potential due to the inverse driving with the scanning signal line $X_1$ in a LOW level and the pixel electrode 305 in a floating state at a point of time t2, the potential of the pixel electrode 305 is also largely shifted downward in the same manner as the voltage $VY_1$ of the data line $Y_1$. Accordingly, to maintain the OFF state of the thin film transistor 303, it is necessary to set the LOW level of the voltage $VX_1$ of the scanning signal line $X_1$ sufficiently lower than the lowered voltage of the pixel electrode 305. Accordingly, in performing the inversion driving of the common electrode voltage Vcom, there arises a drawback that it is necessary to ensure the large potential difference between the LOW level and the HIGH level of the voltage VX of the scanning signal line $X_1$.

Further, as can be understood from changes of voltages $VY_2$, $VY_3$ at a point of time t5 in FIG. 4, the application of gray-scale voltage VsigH to the data signal line $Y_1$ ($VY_1$) causes noises in other lines (for example, $Y_2$ ($VY_2$) $Y_3$ ($VY_3$)). When the electric conduction is not established by the equalizing switch 313, the potential of the voltage $VY_1$ is further largely changed and hence, as indicated by a dotted line in FIG. 4, noises generated in the lines $Y_2$ ($VY_2$) $Y_3$ ($VY_3$) are increased. However, due to the operation of the equalizing switch 313, the common electrode 307 and the data signal line $Y_1$ assume the same potential and hence, the change of the potential present on the signal line $Y_1$ ($VY_1$) is small whereby the influence which the application of gray-scale voltage VsigH to the data signal line $Y_1$ exerts on the common electrode and other lines such as the lines $Y_2$ ($VY_2$), $Y_3$ ($VY_3$) becomes small.

Sequentially, at a point of time t7, the data signal voltage Vsig assumes the green gray-scale voltage VsigH and, at the same time, the G-switch signal voltage Vg assumes a HIGH level and hence, the gray-scale voltage VsigH is applied to the data signal line $Y_2$. At a point of time t8, the G-switch signal voltage Vg assumes a LOW level so that the potential difference (VsigH–VcomL) between the common, electrode voltage Vcom and the data signal voltage Vsig is held in the capacitor 309, and the alignment of liquid crystal composition is adjusted by an electric field generated by the potential difference whereby the brightness of green light is controlled.

Also during a period from a point of time t9 to a point of time t10, in the same manner as described above, at a point of time t9, the data signal voltage Vsig assumes the blue gray-scale voltage VsigH and, at the same time, the B-switch signal voltage Vb assumes the HIGH level and hence, the gray-scale voltage VsigH is applied to the data signal line $Y_3$. At a point of time t10, the B-switch signal voltage Vb assumes a LOW level so that the potential difference (VsigH–VcomL) between the common electrode voltage Vcom and the data signal voltage Vsig is held in the capacitor 309, and an alignment of liquid crystal composition is adjusted by an electric field generated by the potential difference whereby the brightness of blue light is controlled.

Also after a point of time t11, the operation substantially equal to the above-mentioned operation is executed except for that the common electrode voltage Vcom assumes the positive potential VcomH with respect to the data signal voltage Vsig, and the data signal voltage Vsig assumes the negative gray-scale voltage VsigL with respect to the electrode voltage Vcom.

Figure 5:
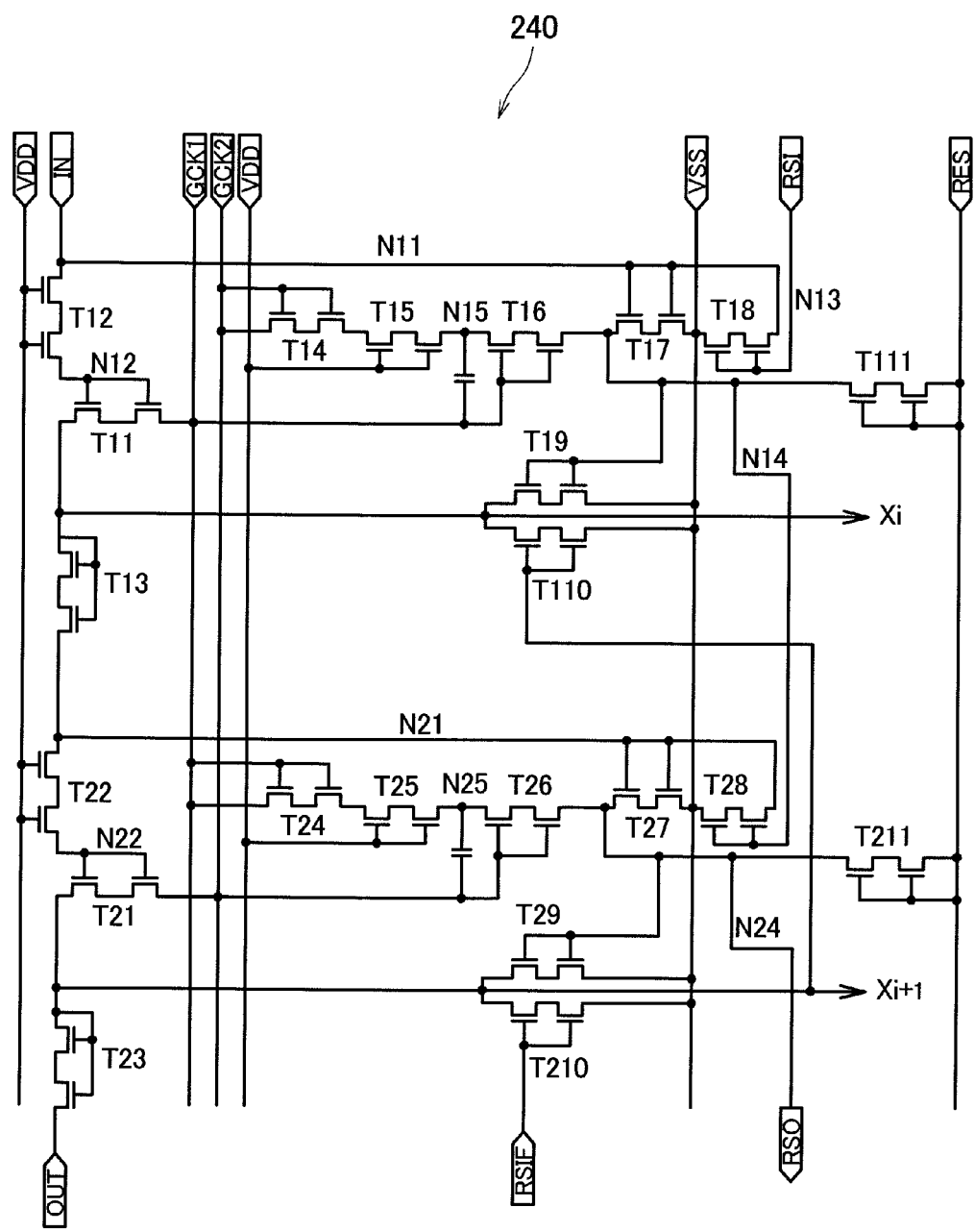
FIG. 5 is a view schematically showing the constitution of a vertical drive circuit.

FIG. 5 schematically shows the constitution of the vertical drive circuit 240. The vertical drive circuit 240 is a shift register which is operated in response to two clock signals, that is, clock signals GCK1, GCK2. FIG. 5 shows sections of the vertical drive circuit 240 which output signals to the scanning signal lines $X_i$, $X_{i+1}$. Here, symbol T indicates transistors and symbol N indicates nodes.

Figure 6:
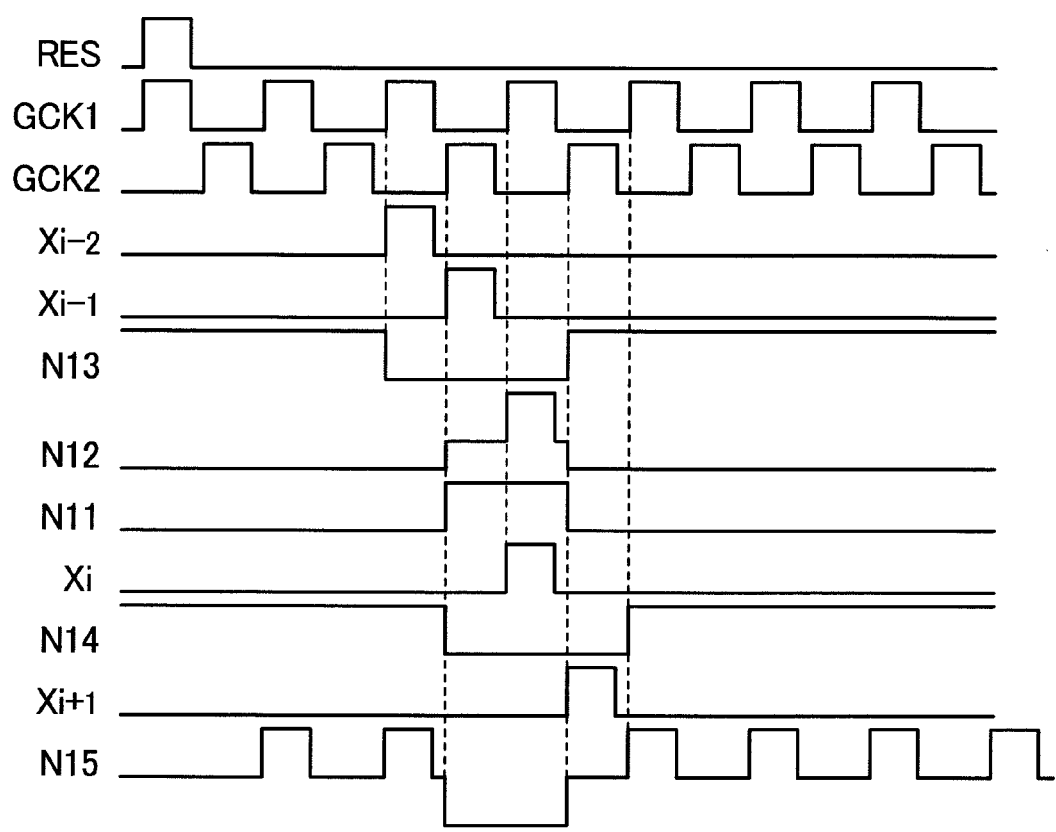
FIG. 6 is a timing chart showing an operation mode of the vertical drive circuit in FIG. 5.

FIG. 6 is a timing chart showing an operation mode of the vertical drive circuit 240 shown in FIG. 5. Hereinafter, the operation of the vertical drive circuit 240 shown in FIG. 5 is explained in conjunction with the timing chart shown in FIG. 6.

First of all, when the output of the scanning signal line $X_i$ is at the LOW level, a node N13 assumes a HIGH level in response to a signal from an upstream side. Since the node N13 assumes a HIGH level, a transistor T18 becomes conductive so that a node N11 which is in a floating state assumes a LOW level (VSS). Since the node N11 assumes a LOW level, a transistor T17 becomes non-conductive so that the node N11 at a LOW level (VSS) and the node N14 are not connected with each other. Further, a node N15 is charged via transistors T14, T15 in response to a clock signal GCK2 and, subsequently, a clock signal GCK1 assumes a HIGH level and hence, the node N14 assumes a HIGH level (charge pump). Due to such an operation, the node N14 maintains a HIGH level state in a stable manner during a period in which the node N11 assumes a LOW level.

Here, the voltage at the node N15 is boosted to a level twice as large as maximum clock amplitude and hence, with the use of the transistor T15 which fixes a gate voltage thereof to VDD, it is possible to alleviate the direct application of the voltage at the node N15 to the transistor T14 thus ensuring the stable operation of the transistor T14 and, at the same time, the transistor T15 per se has the double-gate constitution which uses two transistors thus possessing high dielectric strength.

Next, the case where the output of the scanning signal line $X_i$ is at the HIGH level is explained. Firstly, the node N13 assumes a LOW level when the scanning signal line $X_{i-2}$ rises, and, subsequently, the nodes N11, N12 assume a HIGH level in response to outputting of the scanning signal to the scanning signal line $X_{i+1}$. Since the node N13 assumes a LOW level, the transistor T18 becomes non-conductive, and since the node N11 assumes a HIGH level, the transistor T17 becomes conductive. Accordingly, the node N14 assumes a LOW level (VSS) and a transistor T19 becomes non-conductive. Due to such an operation, a clock signal GCK1 is outputted to the scanning signal line $X_i$ through a line which is connected to the transistor T11 and this signal is transferred to nodes N21, N22 of a succeeding-stage circuit via a transfer diode transistor T13. Here, the voltage at the node N12 is boosted due to a bootstrap operation by an amount which is a sum of an initially-charged voltage and clock amplitude and hence, the clock signal GCK1 is outputted to the scanning signal line $X_i$ without being attenuated.

Here, the high voltage which is approximately twice as high as the clock amplitude is applied to the node N12. Accordingly, a transistor T12 is arranged between the node N12 and the node N11 to prevent the excessive boosting of the voltage at the node N11 whereby it is possible to prevent the occurrence of leaking between a source and a drain of the transistor T18. Subsequently, when the voltage at the node N11 is changed to a LOW level from a HIGH level, the voltage of the node N14 is held at a LOW level and hence, a transistor T110 is made conductive based on an output of the scanning signal line $X_{i+1}$ of the succeeding-stage circuit thus fixing the output signal to the scanning signal line $X_i$ at a LOW level (VSS).

As has been explained in conjunction with FIG. 4, to perform the inversion driving of the common electrode voltage Vcom, it is necessary to ensure the large potential difference between a LOW level and a HIGH level of the voltage $VX_1$ of the scanning signal line $X_1$. For this end, the clock signal GCK1 which is supplied via the line connected to the transistor T11 and is outputted to the scanning signal line $X_1$ becomes the signal having the large potential difference between a LOW level and a HIGH level, that is, the clock having the large amplitude.

Accordingly, the voltage at the node N15 which is boosted twice as high as the maximum clock amplitude becomes the particularly high voltage and hence, it is effective to provide the transistor T15 which fixes the gate voltage thereof to the VDD as a damper (attenuating element) for attenuating the direct application of the voltage at the node N15 to the transistor T14.

Figure 7:
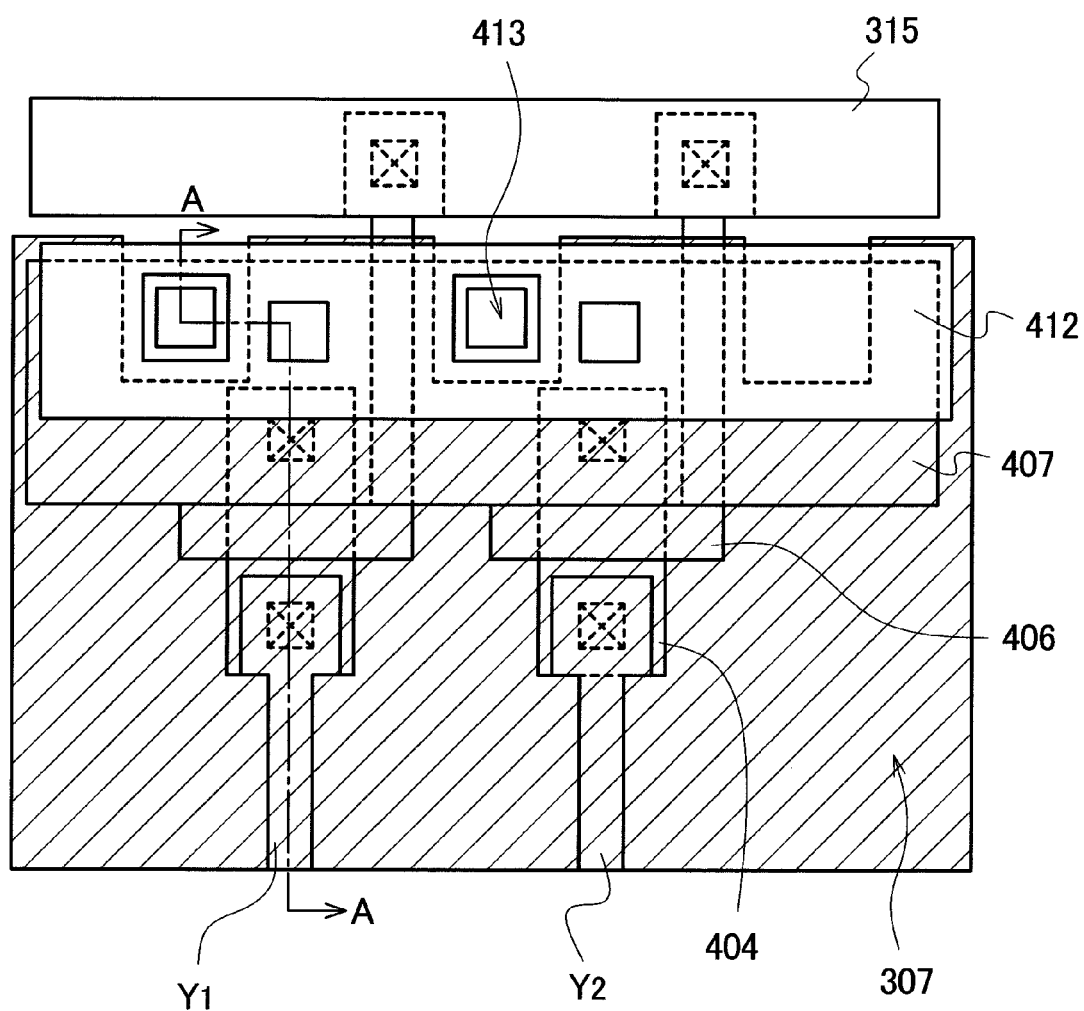
FIG. 7 is a view showing the constitution of a transistor constituting an equalizing switch.
Figure 8:
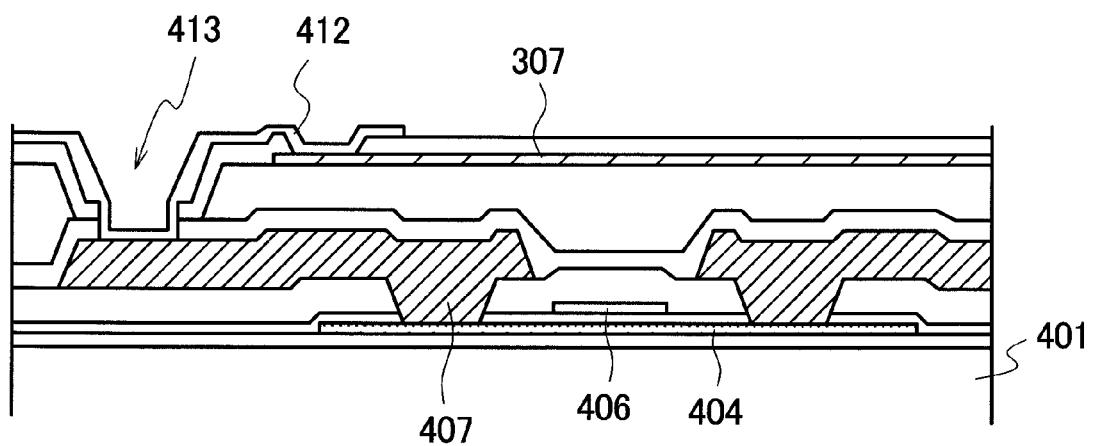
FIG. 8 is a cross-sectional view taken along a line A-A in FIG. 7.

FIG. 7 is a view schematically showing the constitution of a transistor of the equalizing switch 313. FIG. 8 is a cross-sectional view taken along a line A-A in FIG. 7. As can be understood from these drawings, the transistor which constitutes the equalizing switch 313 is constituted of a glass substrate 401, the data signal lines $Y_1, Y_2$ which constitute one of the source/drain lines, an electrode 407 which constitutes the other of the source/drain lines, a semiconductor film 404 which is arranged between the source/drain lines, a gate signal line 406 which is connected to the equalizing switch signal line 315, the common electrode 307, and an electrode film 412 which connects the electrode 407 and the common electrode 307 to each other via a through hole 413. Due to such a constitution, when an equalizing switch signal voltage Veq assumes a HIGH level, the gate signal line 406 assumes a HIGH level so that the data signal lines $Y_1, Y_2$, the electrode 407 and the common electrode 307 are made conductive with each other.

As has been explained heretofore, in the liquid crystal display device according to this embodiment, one common electrode 307 is used as the electrode which faces the pixel electrodes 305 in an opposed manner within the display region and hence, a circuit scale of the drive circuit which controls a potential of the common electrode can be made small.

Further, even when the electrode which faces the pixel electrodes 305 is formed of one common electrode 307, by setting the data signal lines $Y_1$ to $Y_m$ and the common electrode 307 to the same potential using the equalizing switches 313 thus making the change in voltage at the time of applying the gray-scale voltage small, an electrical load can be reduced and, at the same time, noises to other signal lines can be decreased.

Further, the vertical drive circuit 240 possesses the high dielectric strength and hence, it is possible to transmit stable signals to the scanning signal lines $X_1$ to $X_n$.

Here, in this embodiment, the transistor T15 and the transistor T12 are used as transistors for increasing dielectric strength. However, a transistor for increasing dielectric strength may be arranged at any place which is considered to be subjected to high voltage.

What is claimed is:

1. A liquid crystal display device comprising:
a liquid crystal display panel;
a plurality of pixel electrodes which are mounted on the liquid crystal display panel;
a common electrode which is arranged on the same substrate as the pixel electrodes and forms an electric field between the common electrode and the pixel electrodes;
pixel transistors each of which is connected to the pixel electrode and constitutes a switch for applying a grayscale voltage to the pixel electrode;
data signal lines which are connected to the pixel transistors and to which the grayscale voltage is applied;
equalizing transistors which constitute switches for making the common electrode and the data signal lines conductive with each other; and
a shift register which sequentially applies a signal to gate lines of the pixel transistors, wherein
the equalizing transistor is located at a position sandwiched between the same substrate and the common electrode, and is operated so as to make the common electrode and the data signal line conductive with each other at a cycle that the polarity of the common electrode is reversed, and
the shift register includes a transistor which constitutes a damper for attenuating a potential difference.

2. The liquid crystal display device according to claim 1, wherein a clock signal is inputted to the shift register, and the transistor which constitutes the damper is arranged between a node to which a voltage which is twice as large as a voltage of a clock signal is applied and a node to which the clock signal is inputted.

3. The liquid crystal display device according to claim 1, wherein a plurality of transistors each of which constitutes the damper are connected in series.

* * * * *